United States Patent [19]

Kollberg

[11] 4,074,803
[45] Feb. 21, 1978

[54] SCREW CONVEYOR HAVING STOPPER BAR MEANS

[75] Inventor: Ture Eric Kollberg, Port Chester, N.Y.

[73] Assignee: American Defibrator, Inc., Minneapolis, Minn.

[21] Appl. No.: 679,657

[22] Filed: Apr. 23, 1976

[51] Int. Cl.² .............................................. B65G 33/14
[52] U.S. Cl. .................... 198/670; 198/548; 100/145; 425/208; 366/80; 366/89
[58] Field of Search ................. 198/64, 213, 214, 534, 198/548, 558, 670, 671; 259/191; 425/208; 100/145, 150

[56] References Cited

U.S. PATENT DOCUMENTS

| | | | |
|---|---|---|---|
| 1,353,917 | 9/1920 | Lambert | 425/208 X |
| 2,516,770 | 7/1950 | Hanna | 198/214 X |
| 2,540,670 | 2/1951 | Hoenecke | 198/747 |
| 2,770,837 | 11/1956 | Reifenhauser | 198/213 X |
| 3,458,894 | 8/1969 | Wheeler | 259/191 |
| 3,490,624 | 1/1970 | Fichtl | 198/213 |
| 3,633,494 | 1/1972 | Schippers et al. | 428/208 X |
| 3,788,612 | 1/1974 | Dray | 259/191 X |
| 3,812,985 | 5/1974 | Lindeborg et al. | 198/213 X |
| 3,850,415 | 11/1974 | Hansen | 259/191 |
| 3,964,492 | 6/1976 | Crego et al. | 198/213 X |

FOREIGN PATENT DOCUMENTS

| | | | |
|---|---|---|---|
| 1,271,973 | 7/1968 | Germany | 425/208 |

*Primary Examiner*—Bruce H. Stoner, Jr.
*Assistant Examiner*—Richard K. Thomson
*Attorney, Agent, or Firm*—Eric Y. Munson

[57] ABSTRACT

An improved screw feeder such as may be used for conveying ligno-cellulosic materials such as wood chips, shavings, sawdust and the like to pulping apparatus includes a plurality of stopper bars positioned symmetrically about the inner periphery of the screw feeder throat inlet. The stopper bars are narrow, elongate wedge-shaped and extend from the greater diameter flare bore of the conical throat to the lesser diameter taper bore. The stopper bars prevent material from rotating with the screw rather than advancing longitudinally through the throat and thus decrease plugging and clogging problems so that a higher pulping capacity due to improved feed is obtained.

6 Claims, 4 Drawing Figures

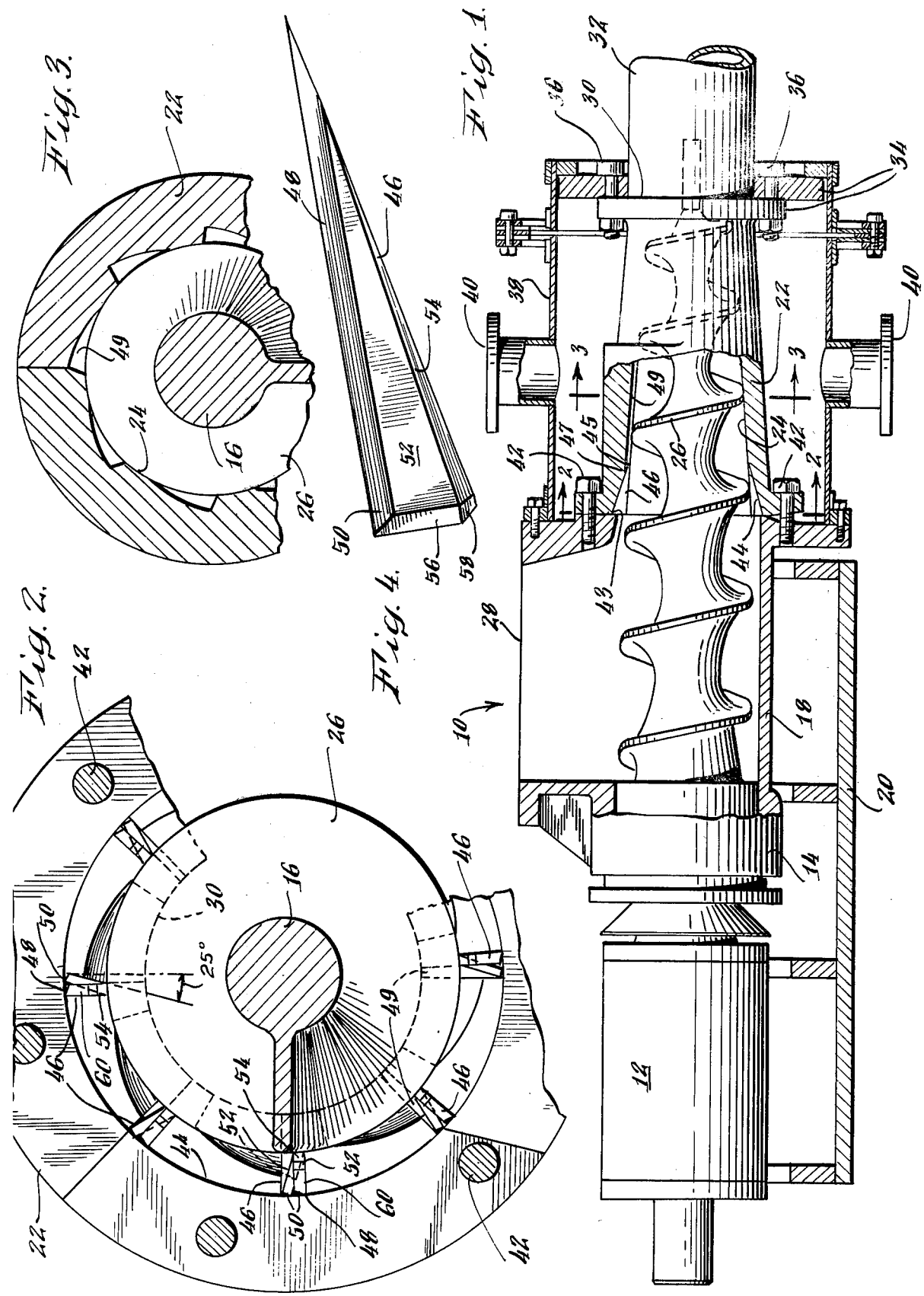

SCREW CONVEYOR HAVING STOPPER BAR MEANS

BACKGROUND OF THE INVENTION

This invention relates to an apparatus for the pulping of wood and other ligno-cellulosic materials and more particularly to screw feeders for conveying such materials, as for example, wood chips, sawdust and the like.

Since the invention of the thermo-mechanical pulping process in the 1930's, see, for example, U.S. Pat. No. 2,145,851 to Asplund, defibrating processes and apparatus for the production of pulp have found increasingly wide spread commercial use. In such processes and apparatus, ligno-cellulosic materials, such as wood chips, shavings and sawdust or nonwood fibers such as sugar cane bagasse, are fed from a hopper or storage bin to screw feeder means to further processing equipment which may include mechanical defibrators or other disc refiners, digesters and other known pulping devices. Trouble-free operation of the screw feeder is desirable in order to maintain throughput of material and continuity of the process to obtain acceptable yields.

Nevertheless, it has been found that spiral screw feed conveyors experience plugging which interupts the uniform flow of material through the apparatus and results in costly machinery down time. Such clogging of the screw feeder may especially occur when the pulping apparatus is employed for the processing of finer materials such as wood chips, bark, shavings, sawdust, sugar cane bagasse and other wet, pitchy and gummy materials. While the use of grooved barrels in screw feeder throats has helped to reduce aspects of this problem, the inlet end of the throat still experiences plugging and results in overloading conditions.

SUMMARY OF THE INVENTION

The aforementioned problems of plugging and clogging of the screw feeder are overcome according to the present invention through the provision of an improved screw feeder having a plurality of stopper bars positioned about the periphery of the entry to the screw feeder throat. The stopper bars according to this invention are basically narrow, elongate wedge-shaped and positioned symmetrically at locations about the inner periphery of the flare bore of the screw feeder throat so as to extend from the location of the greater diameter flare bore to the lesser diameter taper bore.

The improved screw feeder of this invention operates with a significant decrease in plugging and clogging problems. In addition, the screws of screw feeders containing the stopper bars of this invention appear to be less sensitive to wear as well as less sensitive for access clearance between the screw flight and the throat. Moreover, the screw feeder according to this invention results in higher feeding capacity--as much as between 10 and 20 percent.

Accordingly, a feature of the present invention is the provision of a screw feeder means enabling increased operating time and reduced plugging and clogging when used in pulping operations.

The aforementioned and other feature, objects and advantages of this invention will be more apparent from the following description of an embodiment thereof taken in conjunction with the accompanying drawings in which:

BRIEF DESCRIPTION OF THE DRAWINGS

FIG. 1 is a side elevational view, partly in section, of a screw feeder of the type used in pulping apparatus as improved according to an embodiment of this invention with the stopper bars installed in the screw feeder throat;

FIG. 2 is a cross-sectional view taken along the line 2—2 of FIG. 1, showing the positioning of the stopper bars about the screw feeder flare throat;

FIG. 3 is a cross-sectional view taken along the line 3—3 of FIG. 1, showing the screw feeder throat inner circumference downstream of the location of the stopper bars; and FIG. 4 is a perspective view of a stopper bar according to an embodiment of this invention.

DETAILED DESCRIPTION OF THE PREFERRED EMBODIMENT

Referring to FIG. 1, there is shown a feeding apparatus designated generally by the reference character 10. The feeding apparatus 10 includes an electric motor 12 which rotationally drives, through a gear box 14, a helical screw 16 located within a casing 18. The motor, gear box and casing 18 are all supported on a base support member 20.

A portion of the screw 16 extends into a member 22 having a conical bore throat 24. The screw flights 26 of the portion of the screw 16 which are disposed within the conical bore 24 are correspondingly conical in profile. The casing 18 is provided with an opening 28 at the top which functions as an inlet for material which may be received from a storage bin or hopper, chute or the like to feed material therein. The conical throat 24 terminates in an outlet opening at 30. In the embodiment shown, a pipe or conduit 32 is secured to the outlet end of the member 22, through suitable flange and securing bolt means 34 and 36, respectively, to receive the material for further passage through the pulping apparatus, as, for example, to a digester (not shown). The member 22 is shown surrounded by a hood 38 having openings 40 for excape of air, water or other medium therethrough.

The member 22 forming the conical bore 24 is removably secured to the casing 18 by means of bolts 42. The periphery of the inlet end of the bore 24 adjacent the connection with casing 18 is flared as shown at 44. Symmetrically positioned about this flared periphery 44 are a plurality of stopper bars 46, as seen in greater detail in FIGS. 2 and 4. A plurality of longitudinal grooves 49, FIG. 3, extend along the screw feeder throat bore 24.

FIG. 2 shows eight stopper bars 46 symmetrically situated about the flare throat 44 extending from the flare bore at 43 to the taper bore at 45 and adjacent to and overlapping the groove somewhat at 47, as shown in FIG. 1. The stopper bars 46, FIG. 3, have a small, relatively flat surface 48 which is placed snug against the inner surface of the flare throat 44 and has a bevelled edge 50 sloping downward to provide an area for the formation of a continuous weld when the stopper bar 46 is secured in position in the throat 44. A continuous weld can also be provided along the edge opposite from bevelled edge 50. The stopper bar 46 has a side face 52, FIGS. 2 and 4, which is sloped at an angle to a plane passing through the throat axis and along the groove 49, an angle of 25° having been found satisfactory. The adjacent face 54, FIG. 2, and the face 52 may be canted along the length of the stopper bar 46 as seen in FIG. 2 so that they form an angle to a plane longitudinally parallel to the axis of the throat. The stopper bars described may also be included as part of the original castings which are used to manufacture throats of various sizes.

The leading edge surface 56, FIG. 4, of the stopper bar may possess a slight angle with respect to a vertical plane through the bar axis and normal to the upper surface 48 and terminates in an undercut portion 58 of greater angle or bevel, such as 45°, to such a normal plane. The edge 54, in proximity to which pass the screw flights 26, is also bevelled as shown in FIG. 4. The face 60, opposite to the face 52, is relatively planar.

In operation, material to be treated in the pulping apparatus, for example, in the form of wood chips, shavings and sawdust, is fed to the casing 18 through the inlet 28. Rotation of the screw 16 in the proper direction propels the material into the flare throat 42 and conical bore 24. Due to the decreasing radius, the chips are compacted as they travel through the member 22. The material is advanced and passes into the conduit pipe 32 for further processing.

In the absence of the stopper bars of this invention, the material would tend to turn with the rotation of the feed screw 16 rather than advancing longitudinally along the throat and plug the screw feeder at the inlet end of the throat. The presence of the stopper bars 46 in the flare throat 42 eliminates this turning of material and serves to reduce plugging and clogging problems at the inlet end and also results in the screw 16 being less sensitive to wear and less sensitive for excess clearance between the screw and the throat 42. Through the elimination of plugging and clogging there results improved feeding with a reduction in down time and a corresponding increase in productivity with appropriate cost savings.

It should be apparent that the configuration of the inlet portion of the throat and the shape of the stopper bar are important to the invention, since the material fed by the screw conveyor should be able to be introduced into the throat section with the least amount of resistance, while it must at the same time be prevented from being rotated or turned by the screw.

The taper of the bore of the throat must have sufficient longitudinal extension so that the pulp material will be compressed gently and progressively. Thus, if the taper is too steep, the material will not be properly compressed, and plugging will result.

The relation of the height and overall length of the stopper bar is therefore critical to the invention and should be at least 1 to 2, and preferably, 1 to 4.

Thus, the shape and arrangement of the stopper bars 46 need only be such as to reduce plugging and clogging, as can be observed by those skilled in the art. For example, for a 9 inch diameter screw feeder throat with a 4¼ inch long flare bore at the inlet end, the stopper bar is 4½ inches long also and is positioned extending from an 11 11/32 inch flare base to a 1¼ inch taper bore. The stopper bar's entire leading face height, 56 and 58, may be 25/32 inch with a slope of 3/32/inch. The bevelled portion 58 is ⅛ inch by 45°. The bar width is ¼ inch with surface 48 being 1/16 inch wide, while edge 50 is bevelled at a 45° angle with 3/16 inch sides. The edge 54 is formed with a slope of 1/16 inch over the width of ¼ inch. Therefore, the length is over approximately 4 times the maximum height, that is, the leafing edge, while the width ranges from ¼ to ½ the height.

While this invention finds particularly advantageous utility with screw feeders in pulping systems, it can be adapted to screw feeder conveyors in other applications also.

I claim:

1. In a screw conveyor for pulp manufacturing equipment, including feed screw means rotationally mounted within a casing defining a chamber for receiving the pulp material, a throat member connected to and extending longitudinally from said casing and having a conical bore tapering from its inlet end at the material receiving chamber towards a discharge end and being provided with a plurality of longitudinal grooves, the feed screw means extending into said bore to gently and progressively compress the material while it is being advanced therethrough by the rotation of the screw means, the improvement which enhances feeding of the pulp material while preventing the same from turning with the feed screw and thereby prevents clogging, said improvement comprising:
   a. a flared peripheral portion (44) at the inlet end of said throat member defining a flare bore (43) merging with the tapered bore of the throat member; and
   b. a plurality of elongate stopper bar means having a wedge profile seated in said flare bore (43) adjacent to and overlapping the longitudinal grooves in the throat member.

2. The improvement in a screw conveyor according to claim 1, in which the wedge profiled stopper bar means is so dimensioned as to have a length approximately 2–4 times its maximum height at its leading edge.

3. The improvement in a screw conveyor according to claim 2, in which the wedge profiled stopper bars have a width ranging from ¼ to ½ their maximum height.

4. The improvement in a screw conveyor according to claim 1, in which the wedge profiled stopper bars have a relatively flat surface (48) fitting snugly against the inner surface of the flared portion 44 of the throat member to provide a side face (52) which is sloped at an angle to a plane passing through the throat axis at an angle of approximately 25°.

5. The improvement in a screw conveyor according to claim 4, in which the side face (52) and face (54) are canted along the length of the stopper bars so as to form an angle to a plane longitudinally parallel to the axis of the throat member.

6. The improvement in a screw conveyor according to claim 5, in which the stopper bar means posses a slight angle relative to the vertical plane extending through the axis of the stopper bar means and normal to the upper surface (48) and terminating in an undercut portion (58) having an angle on the order of 45° to said normal plane, and the face (60) opposite said face (52) being substantially planar.

* * * * *